United States Patent
Yang et al.

(10) Patent No.: US 10,889,740 B2
(45) Date of Patent: Jan. 12, 2021

(54) AZEOTROPIC AND AZEOTROPE-LIKE COMPOSITION

(71) Applicant: Zhejiang Quhua Fluor-Chemistry Co Ltd, Zhejiang (CN)

(72) Inventors: Bo Yang, Zhejiang (CN); Jiangyong Hong, Zhejiang (CN); Yan Zhang, Zhejiang (CN); Hao Ouyang, Zhejiang (CN); Jinping Fu, Zhejiang (CN)

(73) Assignee: Zhejiang Quhua Fluor-Chemistry Co Ltd, Zhejiang (CN)

(*) Notice: Subject to any disclaimer, the term of this patent is extended or adjusted under 35 U.S.C. 154(b) by 73 days.

(21) Appl. No.: 16/335,680

(22) PCT Filed: Jun. 25, 2018

(86) PCT No.: PCT/CN2018/000231
§ 371 (c)(1),
(2) Date: Mar. 22, 2019

(87) PCT Pub. No.: WO2019/114050
PCT Pub. Date: Jun. 20, 2019

(65) Prior Publication Data
US 2020/0231852 A1    Jul. 23, 2020

(30) Foreign Application Priority Data
Dec. 14, 2017 (CN) .......................... 2017 1 1337331

(51) Int. Cl.
*C09K 5/04* (2006.01)
*C08J 9/14* (2006.01)
*C09K 3/30* (2006.01)

(52) U.S. Cl.
CPC .............. *C09K 5/044* (2013.01); *C08J 9/144* (2013.01); *C08J 9/146* (2013.01); *C09K 3/30* (2013.01); *C08J 2203/142* (2013.01); *C08J 2203/162* (2013.01); *C08J 2203/202* (2013.01); *C09K 2205/122* (2013.01); *C09K 2205/126* (2013.01); *C09K 2205/22* (2013.01); *C09K 2205/32* (2013.01)

(58) Field of Classification Search
CPC .... C09K 5/044; C09K 3/30; C09K 2205/122; C09K 2205/126; C09K 2205/22; C09K 2205/32; C09K 5/04; C08J 9/144; C08J 9/146; C08J 2203/142; C08J 2203/162; C08J 2203/202; C08J 2203/144; C08J 2375/04
USPC .......................... 252/67, 364; 510/408, 415
See application file for complete search history.

(56) References Cited

U.S. PATENT DOCUMENTS

| | | | | |
|---|---|---|---|---|
| 8,055,901 | B2* | 11/2011 | Behm | H04N 1/32203 713/176 |
| 2014/0048739 | A1* | 2/2014 | Rached | F28D 15/00 252/67 |
| 2018/0264303 | A1* | 9/2018 | Robin | C09K 3/30 |
| 2020/0230454 | A1* | 7/2020 | Robin | A62D 1/0071 |

FOREIGN PATENT DOCUMENTS

| | | |
|---|---|---|
| CN | 101743270 | 6/2010 |
| CN | 101878253 | 11/2010 |
| CN | 102015592 | 4/2011 |
| CN | 102939134 | 2/2013 |
| CN | 103228757 | 7/2013 |
| CN | 103228758 | 7/2013 |
| CN | 103370390 | 10/2013 |
| CN | 103228757 | 2/2016 |
| CN | 107365568 A * | 11/2017 |

OTHER PUBLICATIONS

U.S. Appl. No. 62/473,989, filed Mar. 20, 2017. (Year: 2017).*
"International Search Report (Form PCT/ISA/210)", dated Aug. 30, 2018, pp. 1-5.

* cited by examiner

*Primary Examiner* — Douglas J McGinty
(74) *Attorney, Agent, or Firm* — JCIPRNET

(57) ABSTRACT

Provided is an azeotropic and azeotrope-like composition, comprising (E)-1,1,1,4,4,4-hexafluoro-2-butene, (E)-1-chloro-,3,3,3-trifluoropropene and 1,1,1,2,3,3-hexafluoropropane. The azeotropic and azeotrope-like composition has the advantages of low GWP, low thermal conductivity and low energy consumption.

15 Claims, No Drawings

AZEOTROPIC AND AZEOTROPE-LIKE COMPOSITION

CROSS-REFERENCE TO RELATED APPLICATION

This application is a 371 of international application of PCT application serial no. PCT/CN2018/000231, filed on Jun. 25, 2018, which claims the priority benefit of China application no. 201711337331.4, filed on Dec. 14, 2017. The entirety of each of the above-mentioned patent applications is hereby incorporated by reference herein and made a part of this specification.

BACKGROUND OF THE INVENTION

1. Technical Field

The invention relates to azeotropic and azeotrope-like compositions, in particular to an azeotropic and azeotrope-like composition comprising (E)-1,1,1,4,4,4-hexafluoro-2-butene, (E)-1-chloro-3,3,3-trifluoropropene and 1,1,1,2,3,3-hexafluoropropane.

2. Background Art

Due to the gradual cessation of the use of ozone depleting chlorofluorocarbons (CFCs) and hydrochlorofluorocarbons (HCFCs) under the Montreal Protocol, HCFC-141b, now widely used in polyurethane foaming agents, is a hydrochlorofluorocarbon (HCFC), which is an object that must be phased out. Therefore, over the past decade or so, the fluorocarbon industry has been striving to find suitable alternative foaming agents. 1,1,1,4,4,4-hexafluoro-2-butene (HFO-1336mzz) includes trans (HFO-1336mzz(E)) and cis (HFO-1336mzz(Z)), with boiling points of 8.5° C. and 32° C., respectively. Because they contain double bonds in their molecules, after being discharged into the atmosphere, they can be added to the OH radicals quickly and degraded by oxidation. HFO-1336mzz has a short life cycle climate performance (LCCP) (20 days) and a low global warming potential (GWP≈9). With excellent foaming and heat insulation properties, HFO-1336mzz has become one of the best substitutes. It belongs to the fourth generation of foaming agents and has broad market prospects.

Z-HFO-1336mzz can be directly used as a foaming agent. It has environmental sustainability and excellent thermal insulation property. The foaming agent is a stable liquid at room temperature, and the satisfactory foaming performance can be achieved by adjusting the content of Z-HFO-1336mzz in the formulation. Z-HFO-1336mzz also shows excellent performance when used for producing polyurethane foam with metal materials, plastics, elastomer materials and with the main types of polyether polyols (such as Mannichyl polyether, sucrose polyether, polyarylate, etc.). Compared with the currently used foaming agents, the product has obvious properties in environmental protection, heat insulation and heat preservation, is non-flammable, does not deplete ozone, and can replace other liquid foaming agents with low conversion cost, and thus has wide application prospects. E-HFO-1336mzz can be used as a refrigerant or can be compounded as a foaming agent. However, the single HFO-1336mzz component has poor cell stability and poor heat insulation effect, so it is often used in combination with other components.

As disclosed in the patent publication No. CN101743270A and the patent publication No. CN101878253A, a composition comprising Z-HFO-1336 and a poorly compatible activated hydrogen-containing compound having two or more activated hydrogens is used as a foaming agent to react with a suitable polyisocyanate to produce a polyurethane or polyisocyanurate polymer closed cell foam. The polyisocyanate-based closed-cell foam is widely used for insulation purposes and can be used in energy-saving electrical equipment; polyurethane and polyisocyanurate sheets are widely used in roofing materials and cladding materials in the construction industry due to their good thermal insulation property and load carrying capacity.

Further, as disclosed in the patent publication No. CN102015592A, an azeotrope or azeotrope-like mixture of Z-HFO-1336 and diethyl ether, 2-chloropropane or perfluoro-2-methyl-3-pentanone is used as a foaming agent to prepare thermoplastic or thermoset foam.

Further, the patent publication No. CN103228757B discloses a composition of chlorotrifluoropropene and hexafluorobutene, preferably (E)-1,1,1,4,4,4-hexafluoro-2-butene and preferably 1-chloro-,3,3,3-trifluoropropene as the chlorotrifluoropropene, 90 wt % of 1-chloro-,3,3,3-trifluoropropene present in the composition is a trans isomer, which can be used as a refrigerant, a heat transfer fluid, a foaming agent, a solvent and a propellant to meet the requirement of low or zero ozone depletion potential.

Further, the patent publication No. CN103370390A discloses an azeotropic and azeotrope-like composition of trans-1,1,1,4,4,4-hexafluoro-2-butene and water, which can be used to separate (E)-1,1,1,4,4,4-hexafluoro-2-butene and impurities in the production process, and the azeotrope can be used for a foaming agent, a propellant, a refrigerant, a diluent, and the like.

The foaming agent composition disclosed in the above patent has the disadvantages of high GWP, high thermal conductivity, or high energy consumption of the whole machine during use, and therefore, it is desirable to develop a foaming agent composition having better foaming performance and environmental performance.

SUMMARY OF THE INVENTION

It is an object of the invention to overcome the disadvantages of the prior art and to provide an azeotropic and azeotrope-like composition having a low GWP, a low thermal conductivity, and low energy consumption.

In order to solve the above technical problems, the invention is achieved by the following technical solution: a foaming composition comprising (E)-1,1,1,4,4,4-hexafluoro-2-butene (HFO-1336mzz(E)), (E)-1-chloro-,3,3,3-trifluoropropene (HCFO-1233zd(E)) and 1,1,1,2,3,3-hexafluoropropane (HFC-236ea).

As a preferred embodiment of the invention, the azeotropic and azeotrope-like composition preferably comprises 80-95 wt % of (E)-1,1,1,4,4,4-hexafluoro-2-butene, 1-19 wt % of (E)-1-chloro-,3,3,3-trifluoropropene and 1-10 wt % of 1,1,1,2,3,3-hexafluoropropane, and the composition has a boiling point of 8.5° C.±0.5° C. at a pressure of 14 psia±0.5 psia.

As a preferred embodiment of the invention, the azeotrope-like azeotrope-like composition preferably comprises 85-95 wt % of (E)-1,1,1,4,4,4-hexafluoro-2-butene, 1-10 wt % of (E)-1-chloro-,3,3,3-trifluoropropene and 1-5 wt % of 1,1,1,2,3,3-hexafluoropropane, and the composition has a boiling point of 8.5° C.±1° C. at a pressure of 14 psia±0.5 psia.

As a preferred embodiment of the invention, the azeotropic and azeotrope-like composition preferably comprises 90-95 wt % of (E)-1,1,1,4,4,4-hexafluoro-2-butene, 4-9 wt % of (E)-1-chloro-,3,3,3-trifluoropropene and 1-2 wt % of 1,1,1,2,3,3-hexafluoropropane, and the composition has a boiling point of 8° C.±0.5° C. at a pressure of 14 psia±0.5 psia.

An azeotrope refers to a mixed solution of which the gas phase and the liquid phase are completely the same in term of composition under equilibrium, and the corresponding temperature is called azeotropic temperature or azeotropic point. An azeotrope refers to a liquid mixture of two or more components which, when boiled under a constant pressure, has a constant composition and boiling point. Not all binary liquid mixtures can form an azeotrope. The temperature-component phase diagrams of such mixtures have a distinctive feature in that their gaseous lines (the boundary between gas-liquid mixtures and the gaseous phase) have a common highest or lowest point with the liquidus (the boundary between the liquid and gas-liquid mixtures). If the point is the highest point, it is called positive azeotrope; if the point is the lowest point, it is called negative azeotrope. Most azeotropes are negative azeotropes, i.e., having the lowest boiling point. Any azeotrope is for a particular external pressure. Its azeotropic components and boiling point will vary for different pressures. When the azeotrope reaches its azeotropic point, since the composition proportion of a gas portion generated by the boiling is completely the same as that of the liquid portion, the solution components cannot be separated by distillation. That is to say, two or more components of the azeotrope cannot be separated by simple distillation or fractionation.

An azeotrope-like composition has an azeotropic property or a non-fractionation tendency upon boiling or evaporation, and thus the composition of vapor formed during boiling or evaporation is the same or substantially the same as the initial liquid composition, and even if the composition of the liquid changes, it is also a negligible change.

An essential feature of an azeotrope or an azeotrope-like mixture is that the boiling point of the liquid composition is fixed at a given pressure, and the composition of the vapor above the boiling composition is substantially the composition of the boiling liquid composition.

An azeotrope or an azeotrope-like mixture depends on the change in pressure and composition, the azeotropic and azeotrope-like composition of the invention consist essentially of (E)-1,1,1,4,4,4-hexafluoro-2-butene, (E)-1-chloro-,3,3,3-trifluoropropene and 1,1,1,2,3,3-hexafluoropropane in an effective azeotropic or azeotrope-like amount. The azeotropic and azeotrope-like composition of the invention are useful in a variety of applications. For example, the azeotropic and azeotrope-like composition can be used as a working composition of a system composition selected from a refrigerant composition, a foaming agent composition, a sprayable composition, a heat pump composition and a solvent composition.

A preferred embodiment of the invention relates to a refrigerant composition comprising the azeotropic and azeotrope-like composition of the invention.

Another preferred embodiment of the invention relates to a foaming composition comprising the azeotropic and azeotrope-like composition of the invention.

Compared with HCFC-141b and simplex HFC-245fa, the composition of the invention has good chemical stability, cannot be decomposed under normal conditions, will not have reaction with or cause surface corrosion to metal materials used in a polyurethane foaming process, and less affects plastics and elastomers than HCFC-141b; the fluidity and adhesion of foamed materials and the compressive strength and tensile strength of foamed products are improved, the size stability of foam is good, the use of foam material can also be appropriately reduced, and the thermal conductivity is close to HCFC-141b.

Thermal conductivity is an important indicator to measure the thermal insulation property of a polyurethane rigid foam. The gas phase thermal conductivity of the mixture of the invention is slightly higher than that of HCFC-141b, but the thermal conductivity of foamed plastic depends not only on the thermal conductivity of a foaming agent but also on the size and density of cells and on whether the density of the cells is uniform. By improving a foaming formulation, a foam having a lower thermal conductivity can be produced. A polyurethane foam foamed by using the mixture of the invention has relatively fine cells, its thermal insulation performance is equivalent to that of a foam formed by using HCFC-141b, and its energy consumption is about 1% higher, and the energy consumption of cyclopentane is 10% higher than that of HCFC-141b, 7% higher than that of HFC-365mfc and 13% higher than that of HFC-134a.

Another preferred embodiment of the invention relates to a sprayable composition comprising the azeotropic and azeotrope-like composition of the invention.

The composition of the invention comprises chlorotrifluoropropene, hexafluorobutadiene and hexafluoropropane. The composition preferably comprises (E)-1,1,1,4,4,4-hexafluoro-2-butene, (E)-1-chloro-,3,3,3-trifluoropropene and 1,1,1,2,3,3-hexafluoropropane, which has the advantages of low GWP, low thermal conductivity and low energy consumption. The composition is the best substitute for CFC, HFC and HCFC.

DETAILED DESCRIPTION OF THE EMBODIMENTS

The invention is further illustrated by the following specific embodiments, but the invention is not limited to the embodiments described.

Embodiment 1

The following components are physically mixed in a liquid phase state according to their parts by weight to obtain an azeotropic and azeotrope-like composition, and the materials in a mass ratio are: 80% of (E)-1,1,1,4,4,4-hexafluoro-2-butene, 19% of (E)-1-chloro-,3,3,3-trifluoropropene, and 1% of 1,1,1,2,3,3-hexafluoropropane; the properties of the composition are measured after mixing, as shown in Table 1.

Embodiment 2

The following components are physically mixed in a liquid phase state according to their parts by weight to obtain an azeotropic and azeotrope-like composition, and the materials in a mass ratio are: 80% of (E)-1,1,1,4,4,4-hexafluoro-2-butene, 10% of (E)-1-chloro-,3,3,3-trifluoropropene, and 10% of 1,1,1,2,3,3-hexafluoropropane; the properties of the composition are measured after mixing, as shown in Table 1.

Embodiment 3

The following components are physically mixed in a liquid phase state according to their parts by weight to obtain an azeotropic and azeotrope-like composition, and the materials in a mass ratio are: 95% of (E)-1,1,1,4,4,4-hexafluoro-2-butene, 4% of (E)-1-chloro-,3,3,3-trifluoropropene, and 1% of 1,1,1,2,3,3-hexafluoropropane; the properties of the composition are measured after mixing, as shown in Table 1.

Embodiment 4

The following components are physically mixed in a liquid phase state according to their parts by weight to obtain an azeotropic and azeotrope-like composition, and the materials in a mass ratio are: 95% of (E)-1,1,1,4,4,4-hexafluoro-2-butene, 1% of (E)-1-chloro-,3,3,3-trifluoropropene, and 4% of 1,1,1,2,3,3-hexafluoropropane; the properties of the composition are measured after mixing, as shown in Table 1.

Embodiment 5

The following components are physically mixed in a liquid phase state according to their parts by weight to obtain an azeotropic and azeotrope-like composition, and the materials in a mass ratio are: 90% of (E)-1,1,1,4,4,4-hexafluoro-2-butene, 9% of (E)-1-chloro-,3,3,3-trifluoropropene, and 1% of 1,1,1,2,3,3-hexafluoropropane; the properties of the composition are measured after mixing, as shown in Table 1.

Embodiment 6

The following components are physically mixed in a liquid phase state according to their parts by weight to obtain an azeotropic and azeotrope-like composition, and the materials in a mass ratio are: 90% of (E)-1,1,1,4,4,4-hexafluoro-2-butene, 1% of (E)-1-chloro-,3,3,3-trifluoropropene, and 9% of 1,1,1,2,3,3-hexafluoropropane; the properties of the composition are measured after mixing, as shown in Table 1.

Embodiment 7

The following components are physically mixed in a liquid phase state according to their parts by weight to obtain an azeotropic and azeotrope-like composition, and the materials in a mass ratio are: 90% of (E)-1,1,1,4,4,4-hexafluoro-2-butene, 5% of (E)-1-chloro-,3,3,3-trifluoropropene, and 5% of 1,1,1,2,3,3-hexafluoropropane; the properties of the composition are measured after mixing, as shown in Table 1.

TABLE 1

Properties after mixing in Embodiments 1-7

| Component | Unit | Embodiment 1 | Embodiment 2 | Embodiment 3 | Embodiment 4 | Embodiment 5 | Embodiment 6 | Embodiment 7 |
|---|---|---|---|---|---|---|---|---|
| HFO-1336mzz (E) | % | 80 | 80 | 95 | 95 | 90 | 90 | 90 |
| HCFO-1233zd (E) | % | 19 | 10 | 4 | 1 | 9 | 1 | 5 |
| HFC-236ea | % | 1 | 10 | 1 | 4 | 1 | 9 | 5 |
| Pressure | bar | 1.01325 | 1.01325 | 1.01325 | 1.01325 | 1.01325 | 1.01325 | 1.01325 |
| Boiling point | °C. | 8.2 | 8.3 | 7.8 | 7.5 | 8.5 | 8.1 | 7.9 |
| Bubble point | °C. | 9.532 | 8.442 | 8.014 | 7.654 | 8.517 | 7.558 | 8.036 |
| Dew point | °C. | 10.206 | 8.856 | 8.177 | 7.701 | 8.868 | 7.611 | 8.246 |

What is claimed is:

1. An azeotropic or azeotrope-like composition, comprising 80-95 wt % of (E)-1,14,4,4-hexafluoro-2-butene, 1-19 wt % of (E)-1-chloro-3,3,3-trifluoropropene and 1-10 wt % of 1,1,1,2,3,3-hexafluoropropane, wherein the composition has a boiling point of 8.5° C.±0.5° C. at a pressure of 14 psia±0.5 psia.

2. An azeotropic or azeotrope-like composition, comprising 85-95 wt % of (E)-1,1,1,4,4,4-hexafluoro-2-butene, 1-10 wt % of (E)-1-chloro-,3,3,3-trifluoropropene and 1-5 wt % of 1,1,1,2,3,3-hexafluoropropane, wherein the composition has a boiling point of 8.5° C.±1° C. at a pressure of 14 psia±0.5 psia.

3. An azeotropic or azeotrope-like composition, comprising 90-95 wt % of (E)-1,1,4,4,4-hexafluoro-2-butene, 4-9 wt % of (E)-1-chloro-,3,3,3-trifluoropropene and 1-2 wt % of 1,1,1,2,3,3-hexafluoropropane, wherein the composition has a boiling point of 8° C.±0.5° C. at a pressure of 14 psia±0.5 psia.

4. The azeotropic or azeotrope-like composition according to claim 1, wherein the azeotropic or azeotrope-like composition can be is used as a working composition of a system composition selected from a refrigerant composition, a foaming agent composition, a sprayable composition, a heat pump composition and a solvent composition.

5. A refrigerant composition, comprising the azeotropic or azeotrope-like composition of claim 1.

6. A foaming agent composition, comprising the azeotropic or azeotrope-like composition of claim 1.

7. A sprayable composition, comprising the azeotropic or azeotrope-like composition of claim 1.

8. The azeotropic or azeotrope-like composition according to claim 2, wherein the azeotropic or azeotrope-like composition can be is used as a working composition of a system composition selected from a refrigerant composition, a foaming agent composition, a sprayable composition, a heat pump composition and a solvent composition.

9. A refrigerant composition, comprising the azeotropic or azeotrope-like composition of claim 2.

10. A foaming agent composition, comprising the azeotropic or azeotrope-like composition of claim 2.

11. A sprayable composition, comprising the azeotropic or azeotrope-like composition of claim 2.

12. The azeotropic or azeotrope-like composition according to claim 3, wherein the azeotropic or azeotrope-like composition can be is used as a working composition of a system composition selected from a refrigerant composition, a foaming agent composition, a sprayable composition, a heat pump composition and a solvent composition.

13. A refrigerant composition, comprising the azeotropic or azeotrope-like composition of claim 3.

14. A foaming agent composition, comprising the azeotropic or azeotrope-like composition of claim 3.

15. A sprayable composition, comprising the azeotropic or azeotrope-like composition of claim 3.

* * * * *